3,556,663
Filed April 7, 1967
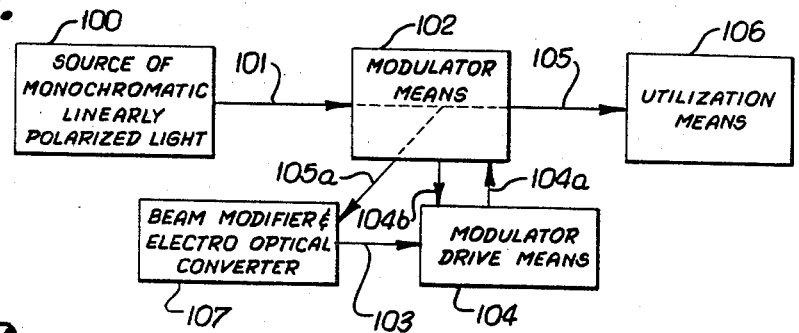
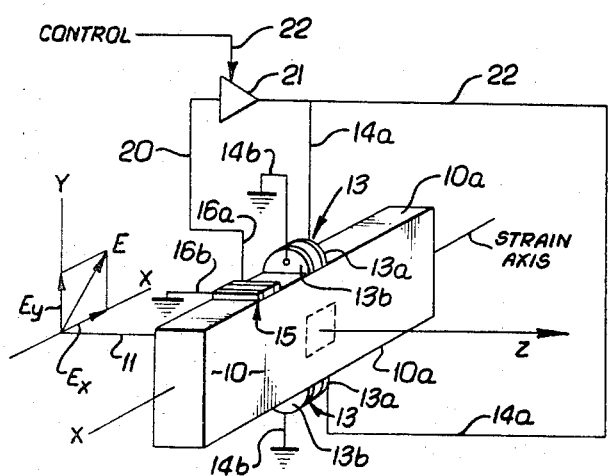
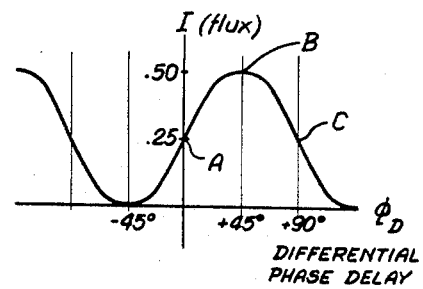
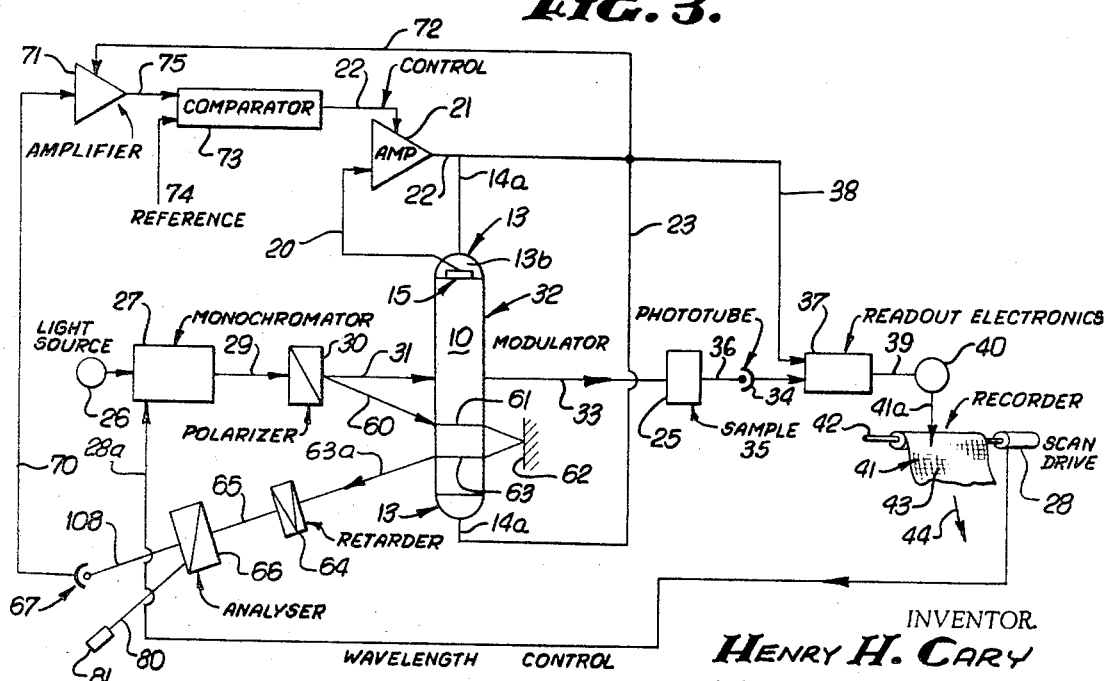
INVENTOR.
HENRY H. CARY
BY White & Haefliger
ATTORNEYS.

United States Patent Office 3,556,663
Patented Jan. 19, 1971

3,556,663
AUTOMATIC CONTROL OF STRAIN MODULATOR
Henry H. Cary, Pasadena, Calif., assignor to Cary Instruments, Monrovia, Calif., a corporation of California
Filed Apr. 7, 1967, Ser. No. 629,261
Int. Cl. G01n 21/40; G02f 1/26
U.S. Cl. 356—116                                  14 Claims

ABSTRACT OF THE DISCLOSURE

The invention concerns the provision, in a control system for maintaining near an optimum level the amplitude of oscillation of differential retardation introduced in a polarized light beam by a cyclically variable retarder, of means responsive to a light beam emergent from the retarder for cyclically driving the retarder. In one example, self-resonant oscillation of the retarder is maintained by the output from a sensor attached to the retarder, and the amplitude of oscillation of the plate is controlled by the light beam emergent from the retarder, all in such manner that a stable equilibrium vibration amplitude of the retarder is maintained, producing peak relative optical phase delay.

---

This invention relates generally to instrumentation for use in making measurements with polarized light. More specifically, it concerns improvements in controlling the magnitude of cyclical birefringence in birefringence modulators.

For present purposes, a birefringence modulator is a cyclically driven device operable upon a linearly polarized beam of radiation to derive a modified beam or beams having cyclically varying elliptical polarization. Such a beam may be utilized for passage through a sample characterized as circularly dichroic, whereby differential absorbance by the sample of left and right circularly polarized light, i.e., circular dichroism, may then be detected and measured. Such a beam also has utility in other types of measuring instruments, such as those for determination of optical rotation produced by specimens. Known birefrigence modulators for producing such beams include strain birefringence modulators and electro-optic modulators, among others; for the sake of simplicity, however, the present invention will only be described as applied to a strain birefringence modulator of advantageous construction and mode of operation as disclosed in the commonly assigned copending application of Hooper et al. for U.S. Letters Patent, entitled, "Strain Birefringence Modulator and Application," now Pat. No. 3,495,912. Also for the sake of simplicity, the invention will only be described as applied to such a modulator for use in a system designed to measure circular dichroism. However, the control system herein described is equally useful in connection with modulators of other types, and in systems for measuring other polarization phenomena.

In order that the ellipticity of polarization of the beam emerging from the modulator may assume optimal values for the purposes of a circular dichroism measurement, the cyclically varying birefringence of the modulator must assume a corresponding optimal amplitude. When the ellipticity of the emerging beam varies sinusoidally with time, optimum circular dichroism measurement accuracy is achieved when the peak retardation is about 113 degrees. For this purpose, vibration of a cyclically strained modulator must be controlled to maintain such a desired peak birefringence magnitude, even though the wavelength of radiation supplied to the modulator is varied. The amplitude of strain variation required in such a modulator to produce optimum ellipticity of the emerging beam varies with wavelength. (Similarly, with modulators of the type described in U.S. Pat. No. 2,591,701 to Jaffe, the amplitude of applied alternating voltage required to produce optimum ellipticity varies with the wavelength of the light.) It is a major object of the present invention to provide for simplified automatic compensation of the electrical signal applied to drive the modulator, in response to variations in the character of a beam of radiation that has passed through the modulator.

Basically, the instrumentation comprises first means, operable upon a beam emerging from the modulator with cyclically varying ellipticity, to derive a modified beam whose intensity also varies cyclically, as a function of the ellipticity of the emergent beam; and second means, responsive to such intensity variation, for cyclically driving the modulator, or controlling the cyclical operation thereof. The relationship between the retardation introduced in the beam emergent from the modulator and the resulting intensity of the modified beam is made such that the system tends toward a stable equilibrium oscillation condition, at which the peak retardation is optimal for use in an associated system for the measurement of circular dichroism. More specifically, a component of the modified beam intensity diminishes as the peak retardation introduced by the modulator increases, near a critical value.

The above mentioned first means typically includes a plane mirror disposed to return an elliptically polarized beam from the modulator for a second pass through the modulator, and a fixed-retardance retarder and an analyzer for further processing the reflected beam to produce the above mentioned modified beam, as will be explained in detail hereinafter.

The above mentioned second means typically includes a phototube receiving the modified beam, and producing an output varying in correspondence to intensity variations of the modified beam, and an amplifier responsive to a component of the output of the phototube.

The amplifier output is employed to control the amplitude with which the modulator is driven, in such a way as to maintain the desired amplitude of oscillation of the ellipticity of the emergent beam, even though the source of monochromatic light is operable to vary the wavelength thereof. As a result, measurements such as the quantitative determination of circular dichroism in a sample, as a function of wavelength, may be carried out with very high accuracy.

For example, in the case of a strain birefringence modulator, vibrated by an electromechanical transducer in response to electrical output of a sensor disposed to detect the cyclical strain or movement of the modulator plate, the said amplifier output may be used to control the gain between sensor and transducer. No coupling is necessary between the modulator drive apparatus and the mechanism which selects different wavelengths for passage through the modulator—other than the "coupling" comprising the beam of light itself.

The above improvements are of unusually advantageous use in a system that includes a linear polarizer to receive unpolarized monochromatic light and to produce linearly polarized ordinary and extraordinary beams incident upon the modulator, the modified beam being derived from the ordinary or extraordinary beam, the other beam passing through the modulator and emerging with cyclically varying elliptical polarization for passage through a sample characterized as circularly dichroic, together with means to detect and measure differential absorbance by the sample of left and right circularly polarized light characteristic of the elliptically polarized beam.

Alternatively, the modified beam may be derived from the same beam used for passage through the sample, by means of any conventional beam splitting device such as, for example, a pellicle mirror.

These and other objects and advantages of the invention, as well as the details of illustrative embodiments, will be more fully understood from the following detailed description of the drawings, in which:

FIG. 1 is a block diagram of a system embodying the invention;

FIG. 2 is a perspective showing of one form of modulator usable in the FIG. 1 system;

FIG. 3 is a more detailed showing of a system wherein the invention is of unusually advantageous use, and as applied to the measurement of circular dichroism of a test sample; and FIG. 4 is a graph of modified beam intensity as a function of differential phase delay between the two vector components of a beam passed through the modulator.

FIG. 1 shows a source 100 of approximately monochromatic linearly polarized light, whose wavelength may be varied. Operating upon a beam or beams 101 of such light is a birefringence modulator means 102 which derives a beam 105 having cyclically varying elliptical polarization. Beam 105 is directed to utilization means 106, which may for example comprise a specimen, a photodetector, and associated electronic circuitry for the measurement of circular dichroism. Modulator means 102 also derives from beam 101 another beam 105a, also having cyclically varying elliptical polarization. As will be explained in detail hereinafter, in a preferred embodiment the polarization condition of beam 105a is not the same as that of 105, the difference resulting from the fact that modulator 102 operates only once upon beam 101 to produce beam 105, but operates twice in sequence upon beam 101 to produce beam 105a.

Beam 105a is directed to beam modifier and electro-optical converter 107 which derives therefrom electrical signal 103 whose magnitude varies as a function of the oscillation amplitude of the ellipticity of beam 105a, and thus of beam 105. Signal 103 is directed to control the modulator drive means 104, and thus to control modulator 102. This system is useful with more than one type of modulator and driving system such as for example the aforementioned Jaffe type. In the case to be discussed in detail here, modulator means 102 is of the strain birefringence type; the drive means 104 receives via path 104b an electrical signal from a sensor, mounted on the modulator and responsive to motion thereof, producing an electrical signal in path 104a, for cyclically stressing the modulator, to produce cyclical birefringence therein.

Modifier-converter 107 is such that the signal 103 influences modulator drive 104 in such a fashion as to maintain the amplitude of oscillation of the differential retardation in beams 105 and 105a near a specified level. As a consequence the loop comprising modulator means 102, converter 107 and drive 104 tends toward oscillation with a characteristic equilibrium amplitude. The modifier-converter 107 is of course at the heart of the invention; its internal operation will be described shortly, in detail.

Referring next to FIG. 2, the modulator illustrated may be used in the FIG. 1 system and comprises a body, as for example plate 10, adapted to pass electromagnetic radiation directed thereto along a predetermined path, say path 11 along the Z axis. The body or plate is characterized as becoming optically plane birefringent under the influence of applied stress. Thus, light which enters the material of the body linearly polarized emerges therefrom elliptically polarized. FIG. 2 shows the electric vector E of plane polarized light incident upon the plate, the vector having component $E_x$ lying in the direction of the strain axis X of the plate 10, and component $E_y$ extending normal to component $E_x$. Also, E extends at a 45 degree angle to each of the axes X and Y. Under these conditions, the phase difference between the $E_x$ and $E_y$ component waves emergent from the plate can be made to vary cyclically by generating within the plate a cyclically varying birefringence, so that the "sense" of the elliptical polarization of the emergent light is periodically reversed. The 45 degree orientation constitutes a special case in which the plane birefringent plate only produces ellipticity, and does not introduce rotation. The transparent plate, which may typically consist of fused silica or "Suprasil," is made appropriately cyclically birefringent by cyclically stressing the plate along its X or strain axis, as indicated in FIG. 2.

FIG. 2 shows drive structure connected in mechanical oscillation transmitting relation to the plate to effect plate vibration along the X or strain axis, as described in the above mentioned commonly assigned Hooper et al. application. The transducer form of drive structure in FIG. 2 includes suitable piezoelectric elements 13 attached to the plate's opposite edges 10a at center nodal points, i.e. halfway along the X-axis dimension of the plate. Merely by way of example, the drivers may consist of barium titanate, being about .125 inch thick, .200 inch wide (i.e. the same as the plate thickness) and about .250 inch long. They may be cut from commercial grade piezoelectric material known as "PZT-4," a product of the Clevite Corporation.

The drivers have opposed conductive coatings 13a and 13b to which electrical connections are made at 14a and 14b to transmit the actuating signal to the devices, thereby to cause the plate to vibrate resonantly along the X-axis or plate length (strain) dimension. With a sinusoidal drive signal input, the sinusoidal strain which the plate undergoes makes the plate become plane birefringent, with the birefringence varying sinusoidally in time. If the plate dimensions are fairly large in relation to the optical beam cross-section dimensions, the strain and hence birefringence are quite homogeneous over the small cross-section 11a intersected by the beam path 11.

As will appear, electrical oscillations are transmitted at 14a from amplifier-oscillator 21 to the drivers with such amplitude as to maintain the peak retardation (in wavelengths) introduced at cross-section 11a by the modulator plate substantially constant, at a predetermined value related to other operating parameters, as explained more fully hereinafter: the plate preferably vibrating longitudinally at its fundamental resonant frequency. Preferably, the plate is made to oscillate in a self-resonant manner. This may, for example, be advantageously accomplished by drawing a signal from a sensor or pickup connected to sense magnitude and phase of plate vibration, which may for example comprise a piezoelectric element 15 attached to the plate proximate its edge 10a as seen in FIG. 2. The output from the sensor is amplified and directed to the drive transducers 13, in phase to produce positive feedback and thus self-resonant plate oscillation. Accordingly, the plate itself continously controls the magnitude and phase of the driving voltage to maintain resonant oscillation even though the natural resonant frequency may vary due to causes that include temperature change and aging. The sensor may also consist of PZT-4 as identified above, .020 inch thick, and glued to the plate edge 10a near one of the nodally mounted drivers. Like the driver, the sensor has opposed conductive coatings to which electrical connection 16a and 16b are made. Both the sensor and the drivers preferably are driven so as to expand and contract most along the dimension parallel to the long dimension of the plate 10. This overall arrangement produces superior power coupling and facilitates ease of assembly. For this purpose, a silica plate measuring 0.2 inch thick, 1.5 inches wide and 2.5 inches long, mechanically resonant lengthwise at about 44.4 kilocycles, may be driven by about 25 volts rms input to the described piezoelectric driver system.

The amplitude of oscillation of the plate is controlled by a control signal 22, which causes the amplification of the amplifier to vary so as to maintain the peak strain of each cycle of vibration of the plate at such magnitude as is required to maintain constant peak retardation, as outlined earlier, e.g., independent of wavelength.

FIG. 3 illustrates the use of the FIG. 2 plate in a system for measuring circular dichroism of a sample 25, and the variation of the circular dichroism with the wavelength of light, or in other words the dispersion of the circular dichroism. The element 26, designated "light source," emits electromagnetic radiation as a continuum over a relatively broad range of wavelengths, which may be in the visible, infrared and/or ultraviolet portions of the electromagnetic spectrum. The term "light" will be used to designate any of such radiation. The monochromator 27 has the function of selecting from this continuum a relatively narrow band of wavelengths for use in measuring the circular dichroism of the sample, as is known. Depending upon the application, the monochromator may be a relatively coarse apparatus, or a fine high-resolution device such as that employed in the Model 60 Automatic Recording Spectropolarimeter produced by Cary Instruments, Monrovia, Calif. A scan drive 28 may be coupled at 28a to the monochromator to cause it sequentially to select different narrow wavelength bands of radiation for transmission at 29, the arrangement being such that the nominal or central wavelengths of the selected bands form the locus of a smoothly varying function of time—a monotonic function—of approximately constant slope.

From the beam 29 leaving the monochromator, a substantially plane polarized component is selected by the polarizer element 30 and transmitted at 31, as the ordinary beam. See in this regard the Model 60 spectropolarimetric apparatus manufactured by Cary Instruments, as well as the article "Circular Dichroism Theory and Instrumentation," by Abu-shumays and Duffield, Analytical Chemistry, vol. 38, June 1966. The extraordinary beam 60 is utilized in the manner as will be described.

Linearly polarized light at 31 is incident upon the vibrating modulator 32, of the construction seen in FIG. 2, so that light leaving the modulator at 33 is in general elliptically polarized, i.e. having electric and magnetic vectors each of whose tips describes an ellipse, in time, when projected into a plane perpendicular to the direction Z of light propagation. Such light may be considered equivalent to two counter-rotating circularly polarized components vectorially added, the relative magnitudes of the two components determining the magnitude of the ellipticity. The algebraic sign of the ellipticity is determined by the direction of rotation of the resultant vector, i.e. by the "sense" of the larger circularly polarized component.

Light leaving the modulator at 33 is incident upon the sample 25, which if optically active, exhibits circular dichroism. That is, it absorbs unequally the circularly polarized components of opposite "sense," so that, as the ellipticity periodically changes sign, the total amount of light emergent from the sample undergoes a corresponding periodic variation, i.e. larger when the light passing through the sample possesses a net circularly polarized component of the sense absorbed to lesser degree by the sample, and smaller when the net circularly polarized component is of the sense absorbed to greater degree by the sample.

A phototube 34 receives both fluctuating and steady (or constant) components of light flux transmitted from the sample at 35 so that the current output of the tube contains both fluctuating and DC components. The fluctuating components are approximately sinusoidal AC, one component of frequency equal to the fundamental frequency of the modulator plate, and other components having frequencies which are odd multiples of the fundamental, and corresponding in magnitude to the difference between the transmission levels for the circularly polarized components of opposite sense. There may also be small relatively insignificant AC current components due to parasitic vibration of the plate 10, at frequencies other than the plate fundamental frequency. The DC component corresponds in magnitude to the sum of the intensities of the two circular components transmitted by the sample.

The phototube output at 36 is fed to readout electronic circuitry 37, which may be comparable to that described in U.S. Pat. 3,257,894 to Grosjean, with the exception that the carrier frequency is the fundamental oscillatory frequency of the modulator plate 10. A synchronizing input signal to circuitry 37 is shown as derived at 38 from the amplifier 21 whose output at 22, 23 and 14a controls the piezoelectric drivers 13, for use in a detector embodied in block 37 to derive a detected version $I_1$, of the AC output component from tube 34. The readout circuitry also derives the ratio of $I_1$ to $I_2$, the latter being a version of the DC output component from the tube 34. The value of the ratio is very nearly proportional to the actual value of circular dichroism of the sample.

To expedite the electronic determination of the ratio $I_1$ to $I_2$ in the best embodiment now known for determination of circular dichroism of absorbing samples, over a wide range of wavelengths, it is desirable to provide an automatic gain-control feature which maintains approximately constant the DC component of the phototube output, at a point in the system ahead of that at which the ratio determination is performed. Such a gain-control feature maintains the signal levels in the ratioing device within suitable operating limits. In one suitable system, the automatic gain-control is in the form of an automatic regulator for the dynode voltage, and maintains the DC current $I_2$ constant to within 1% of a nominal value. (In such a system, the absolute value of the AC component $I_1$ is itself a measure of the circular dichroism, within the accuracy of the regulating system, i.e., 1%.)

An output signal at 39 from the readout 37, and proportional to $I_1/I_2$, is fed to the actuator 40 controlling the position of an ink pen 41a of a strip chart recorder 41, thereby to record a value which is an excellent approximation to circular dichroism of the sample. The scan drive motor 28 referred to above also drives a platen 42 translating the chart paper 43 in a direction 44 normal to the motion of the recording pen, so that the position of the pen longitudinally along the chart paper is a continuous known function of wavelength. Thus an ink tracing of circular dichroism versus wavelength is produced.

As mentioned in the introduction, the invention has as one important purpose the provision of a simplified automatic control of peak retardation at the modulator, thereby eliminating need for independent and objectionably inaccurate programming of the reference voltage at 22 to compensate the modulator for changes in wavelength of the monochromatic light transmitted at 29 and 31. For this purpose, use is made of the extraordinary ray 60 which like the ordinary ray 31 is plane polarized, and constitutes part of beam 101 in FIG. 1. The usage is such that a modified beam 108 (FIG. 3) is derived and characterized in that its intensity varies cyclically as a function of the cyclical retardation amplitude at plate 10.

This is accomplished by *part* of block 107, FIG. 1, and by part of block 102, FIG. 1. Within block 102, a device such as a reflector 62 (FIG. 3) is positioned to receive the beam 60 after it has passed through the vibrating plate 10 at 61, and to return the beam at 63 back through the plate, thereby doubling the phase retardation. By disposing mirror 62 for substantially normal incidence of the beam 61, the retardation effects introduced on reflection at the mirror surface may be maintained at a negligible level. The emergent beam 63a is then passed through a retarder 64, as for example a fixed nominal quarter wave retarder characterized in that incident plane polarized light (properly oriented) emerges from the retarder circularly polarized. Retarder 64 advantageously has its "fast" and "slow" axes oriented one parallel and one perpendicular to the strain axis X of plate 10. The emerging beam 65 then passes through an analyzer 66 which transmits only the component of incident light polarized parallel to the axis of the analyzer. The modified beam 108 emerges from the analyzer, for intensity detection by means including a photomultiplier 67. Components 64, 66 and 67 are part of block 107 of FIG. 1, as are others to be discussed shortly.

In order better to understand the relationship between the resultant intensity of beam 108 and the operation of the plate 10 to cyclically modify the differential phase displacement between components of the electric vector characterizing the plane polarized extraordinary beam 60, consider the following three cases, and refer to FIG. 4 graph. Assume now the extraordinary beam 60 to be polarized *perpendicular* to vector E in FIG. 2, at an azimuth of 45 degrees from the strain axis of the plate 10, so that beam 60 may be resolved into *two equal vector components*, one parallel and one perpendicular to the induced strain axis.

(While a great variety of relative orientations of elements 64 and 66, in conjunction with the polarities of electrical circuitry adapted to receive signals from phototube 67, will produce equivalent results, for the purposes of the analysis to follow hereunder certain simplifying assumptions are made: (a) The retardation introduced by the modulator is positive when the fast axis of the modulator is parallel to the fast axis of the fixed retarder. (b) The extraordinary beam 60 is polarized perpendicular to the transmission axis of the analyzer 66.)

CASE I

When the modulator plate is undergoing zero strain, there is no differential phase delay between the two vector components of the beam. Beam 60 passes through the modulator at 61 and 63 still linearly polarized, is incident on retarder 64 polarized at an azimuth of 45 degrees with the fast axis of the retarder, and exits from the retarder 64 at 65 as a circularly polarized beam, containing one half of the total flux (the other one-half of the flux was lost to the ordinary ray 31). In passing through the analyzer, the beam becomes plane polarized, halving the flux content or intensity of beam 65, so that only one-quarter of the total flux arrives at the photomultiplier 67. Analyzer 66 may be of the Rochon or Senarmont type; in such a system, for the ideal case under consideration, half of the energy at 65 impinging upon analyzer 66 is lost as an extraordinary beam 80 to the mask or light trap 81. This establishes point A on the FIG. 4 graph.

CASE II

When the modulator is undergoing strain to instantaneously produce a 45 degree phase displacement between the two vector components of the linearly polarized extraordinary ray 60, these two components after two passes through the modulator have thus undergone 90° relative phase retardation, and the beam is circularly polarized. The fixed retarder 64 converts this beam to a linearly polarized beam at 65, having its vector in alignment with the transmission axis of the analyzer 66. As a result, there is no loss of flux in the analyzer, and the intensity of light falling on the photomultiplier is 0.5, represented at point B on the FIG. 4 graph.

CASE III

When the modulator is undergoing strain to instantaneously produce 90 degree phase displacement between the two vector components in beam 60, after two passes through the modulator 180 degrees of phase delay have been produced and the beam falling on the retarder 64 is linearly polarized with the vector in effect rotated 90 degrees relative to its position before passage of the beam through the modulator. The beam at 65 is circularly polarized, though of opposite sense relative to that of Case I, so that, as in Case I, one-half of the flux is eliminated in the analyzer leaving beam 108 with only ¼ of the initial flux content. This establishes point C in the graph.

Complete analysis shows that flux intensity I of beam 108 is a continuous sinusoidal function of twice the differential phase delay $2\phi_D$, applying to negative differential phase delay as well as positive. This function is:

$$I_{108} = \frac{1}{4}(1 + \sin 2\phi_D)$$

FIG. 4 also suggests that as phase delay is cyclically generated, the intensity of light falling on the photomultiplier changes cyclically. Analysis of the intensity wave form shows that the intensity variations contain the fundamental frequency of the phase delay fluctuations of the modulator multiplied by the Bessel function $J_1(2\phi_{D\text{-max}})$, so that if the amplitude $\phi_{D\text{-max}}$ of the fluctuating phase delay $\phi_D$ reaches about 110 degrees, the fundamental component of the light intensity fluctuation is reduced to zero. With further increase beyond 110 degrees of peak optical phase delay fluctuation, the fundamental in intensity fluctuation reappears, with reversed sign (in other words, 180 degrees change of time phase) providing a null in the fundamental component of intensity at about 110 degrees peak optical phase delay.

Referring back to FIG. 3, the output 70 of the photomultiplier 67 drives an amplifier 71 containing a synchronous rectifier. The timing for the synchronous rectifier is derived from the oscillator amplifier 21, as indicated by connection 72. The output 75 of the amplifier 71 is then compared at 73 with a reference standard input voltage 74, and the comparator 73 produces a difference output at 22 to control oscillator amplifier 21.

Upon starting of the system, the oscillations of plate 10 increase in magnitude. The light flux in beam 108 results in photomultiplier output current at 70 which on rectification at 71 produces an output voltage increasing the gain of the oscillator amplifier 21 driving the plate 10. When the increasing peak optical phase delay of the modulator approaches the critical value of 110 degrees, the fundamental component of the light intensity fluctuation is diminished and approaches zero, whereby the output of the rectifier at 75 drops toward zero, and the gain of the oscillator amplifier 21 diminishes, causing in turn a decrease in its output 22. (By proper choice of the reference DC potential at 74, either positive or negative or zero, which is added to the rectifier output, the control voltage 22 can be selected so that the amplitude of oscillation can be varied over a range corresponding to several degrees of peak retardation in the plate 10, allowing a desired value of peak retardation to be selected. In practice, if substantial *negative* reference voltage is applied at 74, provision for initiating oscillation will be required.) The decrease in control voltage 22 in turn acts to limit the fundamental component and to control the amplifier 21 in such manner that the system reaches an equilibrium condition proximate a peak optical phase delay of about 110 degrees or such other angle near 110 degrees as may be desired, as, for example, 105 degrees.

The reverse in sign of the fundamental component of intensity fluctuation, in passing through the null, results in negative feedback around the loop comprising phototube 67, amplifier 21, drivers 13, plate 10, retarder 64, and analyzer 66. This change in sign or time phase of the fundamental component of intensity fluctuation of the light beam 108 is manifested in a corresponding change in sign, or phase, of the electrical signals at 70 and 75. The result is a stable equilibrium vibration amplitude of plate 10, such as to produce peak relative optical phase delay of approximately 110 degrees.

While the retarder 64 has been chosen as a quarter-wave device because this retardation maximizes the fundamental component of the signal at the phototube, and thus maximizes the sensitivity of the automatic control mechanism, retarder 64 can also be chosen to have any other retardation whose sine is not zero, and the device will operate, but not with maximum sensitivity.

Retarder 64 need not be a device whose retardance as measured in wavelengths is constant for light of different wavelengths. In view of the preceding statements regarding maximization of sensitivity, variation with wavelength of the retardance of the fixed retarder results only in a variation with wavelength of the sensitivity of the automatic control mechanism. The retarder 64 may be chosen to be a quarter-wave device at some wavelength roughly central to the wavelength range over which the instrument is to operate.

Analyzer 66 has been described as of the Rochon or Senarmont type; alternatively a pile-of-plates or Polaroid sheet analyzer may be used. Such a substitution would result in modification of the three-case analysis presented above, as regards the magnitude of the light flux reaching phototubes 67, in a predictable fashion to those skilled in the art.

It is found that for maintenance of optimal elliptical polarizations of beam 33, for the particular circular dichroism measurement system described in the above-referenced copending application of Hooper et al., the amplitude of phase delay introduced by the plate 10 should be approximately 113 degrees. Thus, the system operates at equilibrium under conditions favoring highly precise measurement of circular dichroism in samples. Similar arrangements of fixed retarders and analyzers may be employed to produce similar steady-state cyclical variation of birefringence in modulators, but with other amplitudes closely approximating ideal modulation amplitudes for other types of measurement systems, as will be apparent to those skilled in the art.

I claim:

1. In a control system for maintaining near a predeterminded substantially constant optimum level the amplitude of oscillation of differential retardation introduced by a cylically variable optical retarder, in a polarized light beam characterized by sequentially different wavelengths of radiation, the improvement comprising:

means, receiving and responsive to a light beam emergent from such retarder, for cyclically driving said retarder so as to maintain said amplitude near said predetermined substantially constant optimum level at each of said sequentially different wavelengths.

2. In apparatus for modulating the ellipticity of polarization of a beam of light, including a polarization modulator operable upon an incident linearly-polarized beam of radiation characterized by sequentially different wavelengths to produce at least one emergent beam having cyclically varying ellipticity, the improvement comprising:

first means, receiving and operable upon one emergent beam, for generating a modified beam whose intensity varies cyclically as a function of said cyclically varying ellipticity; and second means, receiving said modified beam and responsive to a characteristic of said cyclically varying intensity, for controlling said modulator to maintain the amplitude of the cyclical variation of said ellipticity near a predetermined level at each of said sequentially different wavelengths.

3. The apparatus of claim 2, wherein:
said cyclically varying ellipticity has a frequency of variation; and
said characteristic is defined as an intensity component which varies cyclically at said frequency, said component vanishing when said amplitude is at said predetermined level.

4. The apparatus of claim 2, wherein:
said cyclically varying ellipticity has a frequency of variation; and
said characteristic is defined as an intensity component which varies cyclically at said frequency, said component approaching zero at said predetermined level.

5. A control system for maintaining near a predetermined and substantially constant optimum level the amplitude of oscillation of differential retardation introduced in a polarized light beam by a cyclically variable optical retarder electrically driven at some frequency, said beam being characterized by having different wavelengths in sequence, said control system comprising:

first means, receiving and responsive to a light beam emergent from such retarder, for generating a modified beam whose intensity varies in correspondence to the instantaneous magnitude of differential retardation of said emergent beam;

second means, receiving and responsive to said modified beam, for generating an electrical signal at said frequency, the signal having amplitude decreasing with increasing retardation oscillation amplitude near said predetermined and substantially constant optimum level; and third means for applying said electrical signal to control said retarder, to maintain nea rsaid predetermined optimum level said amplitude of oscillation of differential retardation introduced in the beam while said sequence progresses.

6. The system of claim 5, wherein said electrical signal amplitude passes through a null when said amplitude of oscillation of differential retardation is near said optimum level, and said electrical signal has a phase which reverses at said null.

7. A feedback system for maintaining substantially at a predetermined optimum level the oscillation amplitude of differential retardation introduced by an electrically driven cyclically variable optical retarder in a polarized light beam which is subject to sequential variation of selected wavelength, said system comprising:

first means, receiving and responsive to said light beam, for generating a modified beam whose instantaneous intensity corresponds to the instantaneous magnitude of such differential retardation; and second means, receiving said modified beam and responsive to a component of said modified beam, for producing a driving signal for such variable retarder;

whereby such oscillation amplitude tends to an equilibrium level near such predetermined optimum level irrespective of said sequential variation.

8. The improvement of claim 2 wherein:
said first means comprises a reflector positioned to return said one emergent beam to pass again through the modulator, a fixed retarder, and an analyzer for sequentially processing said emergent beam to drive therefrom said modified beam; and
said second means comprising a photodetector positioned to receive said modified beam, and an amplifier responsive to the electrical output of said photodetector, the output of said amplifier controllably driving said modulator.

9. The improvement of claim 4, wherein:
said first means comprises a fixed retarder and a polarizing element receiving said one emergent beam; and
said second means comprises a photodetector whose output controls electronic apparatus selectively responsive to electrical oscillation at such frequency, the output of said apparatus being connected to drive said modulator.

10. The control system of claim 5 including instrumentation for the measurement of circular dichroism connected with said system to receive polarized light emerging from said retarder.

11. The apparatus of claim 2, wherein said modulator is a strain birefringence modulator.

12. In apparatus for modulating a beam of plane polarized electromagnetic radiation having sequentially different wavelengths, first means including a cyclically strained polarization modulator operable upon said plane polarized beam of radiation to derive a modified beam characterized in that the intensity thereof varies cyclically as a function of said cyclical strain; and second means receiving said modified beam and responsive to said intensity variation for controlling cyclical stressing of the modulator producing cyclical strain therein and so as to maintain the amplitude of said cyclical strain near predetermined optimum levels in spite of said sequentially differing wavelengths.

13. The improvement as defined in claim 1 wherein said means includes means for causing said emergent beam to pass subsequently through the retarder.

14. The improvement as defined in claim 1 including other means for receiving and operating upon said first mentioned polarized light beam for detecting and measuring the circular dichroism of a sample in the path of said first mentioned beam.

References Cited

UNITED STATES PATENTS

| | | | |
|---|---|---|---|
| 2,064,289 | 12/1936 | Cady | 350—149 |
| 2,622,470 | 12/1952 | Rines | 350—149 |
| 2,976,764 | 3/1961 | Hyde et al. | 356—116 |
| 3,243,722 | 3/1966 | Billings | 331—94.5 |
| 3,257,894 | 6/1966 | Grosjean | 356—117 |
| 3,277,392 | 10/1966 | Nicolai | 331—94.5 |
| 3,379,887 | 4/1968 | Stephany | 350—149 |

FOREIGN PATENTS

| | | | |
|---|---|---|---|
| 151,065 | 1962 | U.S.S.R. | 356—116 |
| 1,089,953 | 1967 | Great Britain | 356—116 |

RONALD L. WIBERT, Primary Examiner

J. ROTHENBERG, Assistant Examiner

U.S. Cl. X.R.

250—225; 350—149; 356—117

UNITED STATES PATENT OFFICE
CERTIFICATE OF CORRECTION

Patent No. __3,556,663__                Dated __January 19, 1971__

Inventor(s) __Henry H. Cary__

It is certified that error appears in the above-identified paten and that said Letters Patent are hereby corrected as shown below:

In the drawings; in Fig. 2, the small broken line rectangle on plate 10 should be designated by the numeral 11a .

in Fig. 3, the lead line from numer 36 should extend to the horizontal line between the photot 34 and the block 37.

Column 2, lines 64 and 65; "gether with means to det and measure differential adsorbance by the sample of left right circularly polar-" should read --gether with means detect and measure differential absorbance by the sample c left and right circularly polar- --

Column 4, line 65; "kilocycles, may be driven by abc 25 volts rms input to" should read --kilohertz, may be c by about 25 volts rms input to--

In column 5, line 46; the numeral "33" should be in boldface type.

Column 10, line 20; "said retarder, to maintain nea predetermined" should read --said retarder, to maintain said predetermined--

Column 10, line 50; "sequentially processing said emergent beam to drive" should read --sequentially proce said emergent beam to derive--

Signed and sealed this 21st day of September 1971

(SEAL)
Attest:

EDWARD M. FLETCHER, JR.          ROBERT GOTTSCHALK
Attesting Officer                Acting Commissioner of P